United States Patent
Hihara et al.

(10) Patent No.: US 10,343,727 B1
(45) Date of Patent: Jul. 9, 2019

(54) TWO-PIECE DECK POST

(71) Applicant: Toyota Motor Engineering & Manufacturing North America, Inc., Erlanger, KY (US)

(72) Inventors: Yasuyuki Hihara, Canton, MI (US); Christopher M. Higgins, Ann Arbor, MI (US); Scott P. Robison, Dexter, MI (US); Scott L. Frederick, Brighton, MI (US); Adam D. Holmstrom, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/884,728

(22) Filed: Jan. 31, 2018

(51) Int. Cl.
*B62D 29/00* (2006.01)
*B62D 33/023* (2006.01)
*B62D 33/02* (2006.01)

(52) U.S. Cl.
CPC ........... *B62D 29/008* (2013.01); *B62D 33/02* (2013.01); *B62D 33/023* (2013.01)

(58) Field of Classification Search
CPC ..... B62D 29/008; B62D 33/023; B62D 33/02
USPC ...................................................... 296/183.1
See application file for complete search history.

(56) References Cited

U.S. PATENT DOCUMENTS

| 4,136,905 | A | 1/1979 | Morgan | |
| 6,092,862 | A | 7/2000 | Kuwahara | |
| 7,222,913 | B2 * | 5/2007 | Womack | B62D 21/02 296/205 |
| 7,284,787 | B2 | 10/2007 | McNulty et al. | |
| 7,588,285 | B2 | 9/2009 | Mohammed | |
| 9,073,586 | B1 | 7/2015 | Courtright et al. | |
| 9,126,630 | B1 | 9/2015 | Gallagher et al. | |
| 9,145,176 | B1 | 9/2015 | Van Wyk et al. | |
| 9,162,715 | B1 | 10/2015 | Marchlewski et al. | |
| 10,150,519 | B2 * | 12/2018 | Higgins | B62D 33/023 |
| 2006/0082191 | A1 * | 4/2006 | McNulty | B62D 33/02 296/183.1 |
| 2006/0108835 | A1 * | 5/2006 | McClure | B62D 25/04 296/193.06 |
| 2010/0109385 | A1 | 5/2010 | Yamada et al. | |
| 2018/0001938 | A1 * | 1/2018 | Higgins | B62D 33/02 |
| 2018/0065682 | A1 * | 3/2018 | Maier | B62D 21/157 |
| 2018/0118280 | A1 * | 5/2018 | Marchlewski | B60Q 1/30 |

* cited by examiner

*Primary Examiner* — Jason S Morrow
(74) *Attorney, Agent, or Firm* — Christopher G. Darrow; Darrow Mustafa PC

(57) ABSTRACT

A rear deck post assembly is provided for reinforcing a cargo bed of a utility vehicle. The assembly includes a first deck mount coupled to a vehicle frame, and a first rear deck post coupled to the first deck mount. A second deck mount is provided coupled to the vehicle frame and spaced apart from the first deck mount. A second rear deck post is coupled to the second deck mount. A deck sill component is provided longitudinally extending between the first deck post and the second deck post. Deck bolts may be used to couple the deck sill component, deck mounts, and deck posts to the vehicle frame. The first and second deck mounts and deck posts may be a cast aluminum alloy, a cast magnesium alloy, or a fiber reinforced composite material.

18 Claims, 5 Drawing Sheets

TWO-PIECE DECK POST

TECHNICAL FIELD

The present disclosure generally relates to deck posts, and more particularly, to a two-piece deck post assembly for a pickup truck utility vehicle.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Utility vehicle cargo beds such as truck beds, and the like, should be robust in order to withstand wear and tear from normal use. In one specific example, truck beds of pickup trucks may be provided with front and rear deck posts as major structural components. The deck posts are commonly made of numerous components and parts that are mechanically fastened or welded together. For example, it is not unusual for a deck post to be made of nine or more separate pieces in order to withstand the potential inboard, outboard, and the resulting cantilevered forces that may arise under different deck loading conditions. Preferably the deck posts are also designed to accommodate forces and loads from auxiliary components, such as tie down hooks. In addition to the strength considerations, the deck posts are also a common place to accommodate tail lights, tailgate hinges, tailgate stoppers, tailgate dampeners, stake pockets, and more. Thus, the rear deck posts may need to be provided with apertures and other connection mechanisms. Such strength and design considerations have led to complex assemblies that may require additional tools or assembly steps, may lead to additional component weight, and ultimately result in higher costs of manufacture.

Accordingly, it would be desirable to provide an improved deck post design that maintains the strength requirements while lowering and/or minimizing weight and costs of manufacture and production.

SUMMARY

This section provides a general summary of the disclosure, and is not a comprehensive disclosure of its full scope or all of its features.

In various aspects, the present teachings provide a two-piece rear deck post assembly for reinforcing a cargo bed of a utility vehicle. The assembly includes a first deck mount coupled to a vehicle frame, and a first rear deck post coupled to the first deck mount. A second deck mount is provided coupled to the vehicle frame and spaced apart from the first deck mount. A second rear deck post is coupled to the second deck mount. A deck sill component is provided longitudinally extending between the first deck post and the second deck post. In various aspects, at least a portion of each of the first rear deck post and the second rear deck post defines an exterior surface of the cargo bed of the utility vehicle that is exposed to an external environment. The first and second deck mounts and deck posts may be a cast aluminum alloy, a cast magnesium alloy, or a fiber reinforced composite material In other aspects, the present teachings provide a reinforced cargo area for a pickup truck. The reinforced cargo bed includes a frame and a cargo bed coupled to the frame. The cargo bed may include a forward end, a rearward end, two opposing sidewalls, and a bed floor. A first cast alloy deck mount is provided, coupled to the frame at the rearward end of the cargo bed. A first cast alloy rear deck post is coupled to the first cast alloy deck mount. A second cast alloy deck mount is coupled to the frame at the rearward end of the cargo bed and spaced apart from the first cast alloy deck mount. A second cast alloy rear deck post is coupled to the second cast alloy deck mount. A deck sill component is provided, longitudinally extending between the first cast alloy rear deck post and the second cast alloy deck post. In various aspects, at least a portion of the first rear deck post and the second rear deck post define an exterior surface of the cargo bed that is exposed to an external environment. The deck sill component may be disposed underneath the bed floor.

In still other aspects, the present teachings provide a pickup truck with a reinforced cargo area. The pickup truck includes a frame and a cargo bed coupled to the frame and having a forward end, a rearward end, two opposing sidewalls, and a bed floor. First and second spaced apart two-piece deck post assemblies are provided. Each deck post assembly includes a cast aluminum deck mount coupled to the frame at the rearward end of the cargo bed, and a cast aluminum deck post coupled to the respective deck mount. Each deck post includes a vertically extending pillar portion and a horizontally extending coupling portion. A deck sill component is provided, formed using extrusion techniques and defining a U-shaped sleeve having a substantially uniform cross-section along a length dimension. The deck sill component is coupled to the deck mounts and longitudinally extends between the horizontally extending coupling portions of the deck posts. In various aspects, the pillar portion of each deck post is configured to exhibit a tapering I-value that is greatest at a lower region near the horizontally extending coupling portion in order to minimize any deflection from a force applied to the respective rear deck post assembly.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the devices, methods, and algorithms among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of the figures.

DETAILED DESCRIPTION

The present technology generally provides a more simplified two-piece rear deck post assembly for a utility type vehicle that includes a cargo area for transporting items, such as a cargo bed or truck bed of a pickup truck, or the like. Generally, the present technology provides first and second spaced apart two-piece rear deck post assemblies. Each two-piece rear deck post assembly includes a deck mount that is coupled to at least one frame component of the utility vehicle, for example at the rearward end of the cargo bed. Each two-piece deck post assembly also includes a deck post coupled to the respective deck mount. As will be described in more detail below, the deck post may include a vertically extending pillar portion and a horizontally extending coupling portion. The deck mounts and the deck posts may be a cast metal, such as an aluminum alloy or a magnesium alloy. Forming the components as a cast metal allows for the incorporation of various useful features that can be specifically designed and tailored in the mold or cast. A deck sill component is also provided, preferably formed using extrusion techniques and defining a U-shaped sleeve having a substantially uniform cross-section along a length dimension. The deck sill component is coupled to the deck mounts and longitudinally extends between the horizontally extending coupling portions of the deck posts.

Figure 1:
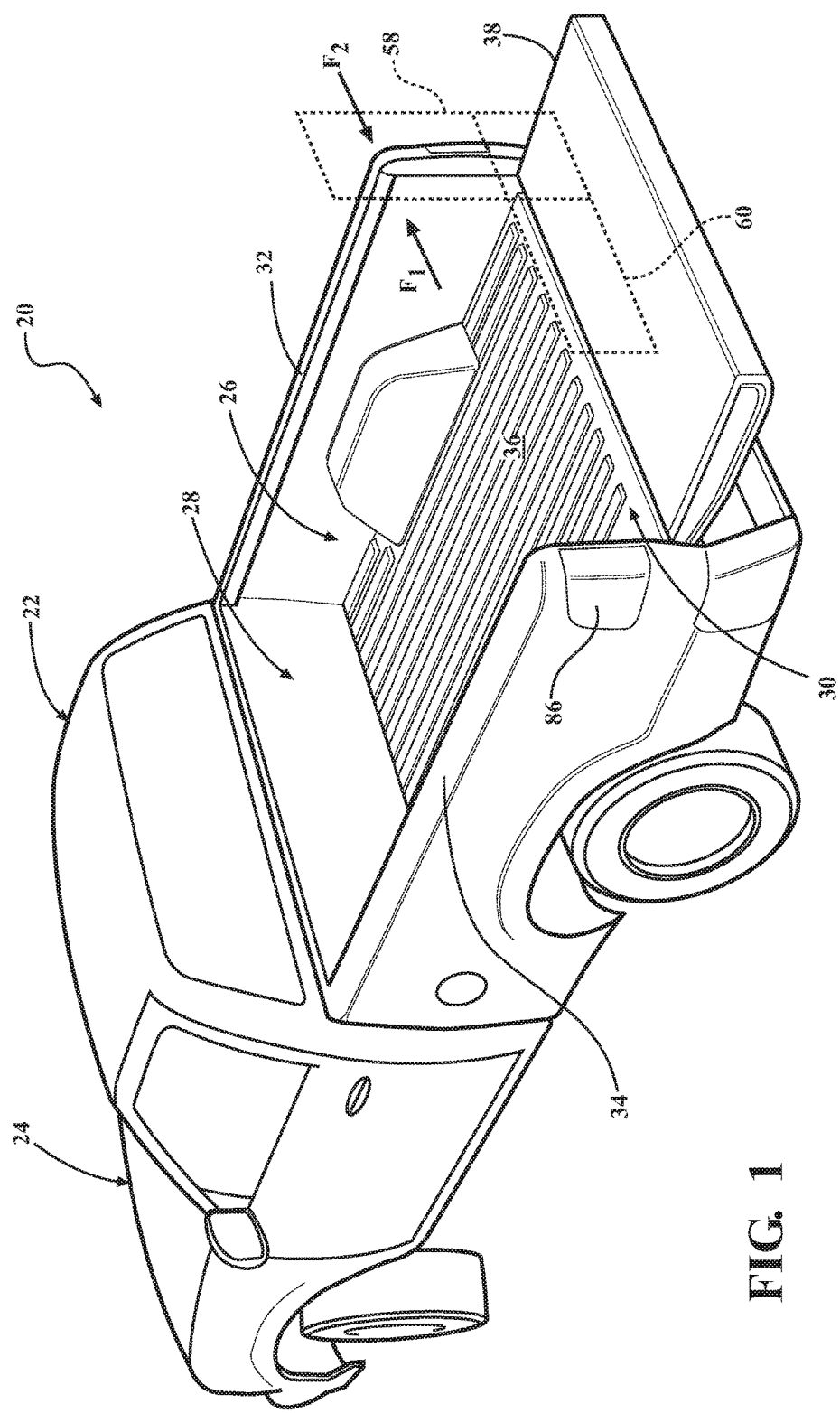
FIG. 1 is a rear perspective view of an exemplary pickup truck type of utility vehicle having a cargo bed that can benefit from the two-piece deck post assembly of the present technology.

FIG. 1 is a rear perspective view of an exemplary pickup truck type of utility vehicle having a cargo bed that can benefit from the two-piece deck post assembly of the present technology. As illustrated, the pickup truck 20 may include a passenger compartment 22 and a front end 24. A rear portion of the pickup truck 20 can include a cargo area, or cargo bed 26, that is coupled to the vehicle frame at various locations and is configured for transporting cargo, as well as for various other uses. The cargo bed 26 may generally be provided with a forward end 28, a rearward end 30, two opposing sidewalls 32, 34, and a bed floor 36. A tailgate 38 may be provided pivotally coupled to a rearward end 30 of the cargo bed 26, preferably secured to the deck posts.

While the present technology may be described and presented in the drawings with respect to a pickup truck as an exemplary utility vehicle, it should be understood that the two-piece post assemblies disclosed herein may be used with a variety of differently configured vehicles with cargo areas or cargo beds, for travel either on paved government streets/roads as well as for off-road use.

Figure 2:
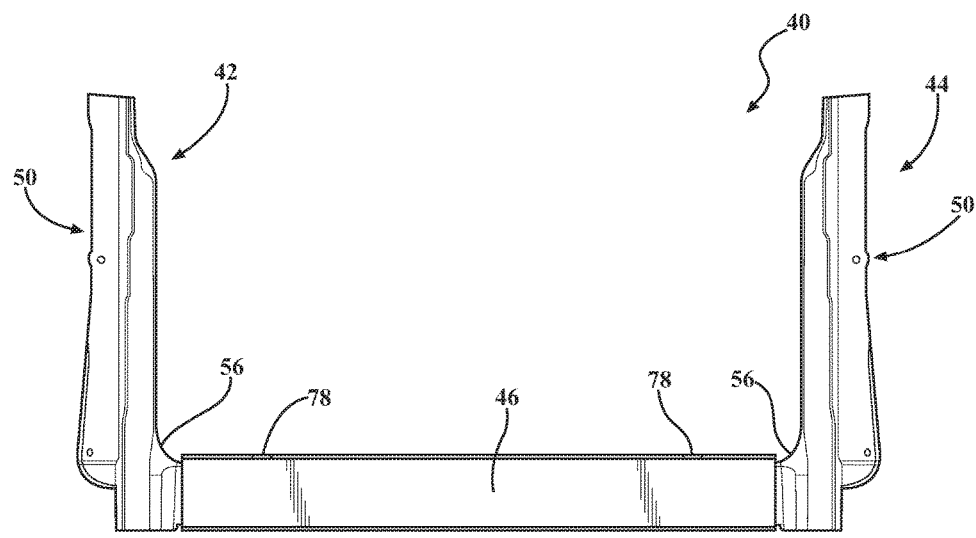
FIG. 2 is a rear plan view of a combination of left and right side two-piece rear deck post assemblies with a deck sill component extending there between for reinforcing a cargo bed of a utility vehicle according to various aspects of the present technology.

FIG. 2 is a rear plan view of a combination 40 of left and right side two-piece rear deck post assemblies 42, 44 with a deck sill component 46 extending there between for reinforcing the cargo bed 26 of a utility vehicle 20 according to various aspects of the present technology. Each two-piece rear deck post assembly 42, 44 includes a deck mount 48 that is configured to be coupled to at least one vehicle frame component (see, FIG. 6) and a deck post 50. As will be described in more detail below, the deck post 50 may generally include a vertically extending pillar portion 52 and a horizontally extending coupling portion 54. The intersection of the pillar 52 and coupling portion 54 may be provided with a curved or rounded exterior surface 56.

With renewed reference to FIG. 1, it should be understood that the distal or rearward end 30 of the cargo bed 26 should be designed to perform under unique loading requirements due to the different types of forces and loads that may be applied from cargo or auxiliary components. In various aspects, auxiliary components, such as tie down hooks, may exert forces against the cargo bed, originating from multiple angles and direction. The opposing sidewalls 32, 34 of the cargo box may experience forces and loads applied in various direction from the use of other auxiliary items such as tool boxes, ladders, cargo, and the like. Preferably all, or at least a portion, of these forces and applied loads are ultimately transferred to a frame component of the vehicle. With the present technology, preferably the forces and applied loads are transferred to the vehicle frame via the rear deck posts 50, respective deck mounts 48, and the deck sill component 46.

$F_1$ and $F_2$ of FIG. 1 depict outwardly and inwardly applied forces, respectively. For illustrative purposes, box 58 generally represents the structural support provided by the deck post assembly 44, and box 60 represents the structural support provided by the deck sill component 46. If $F_1$ represents an exemplary 150 kg force applied to an upper region of the rear deck post assembly 44 area, the rear deck post 50 needs to be configured to absorb a load at the top portion of the post. In turn, the bottom portion of the rear deck post 50 will exert a moment on the distal end of the deck sill component 46. Thus, the rearward end of the sidewalls should be configured to withstand, among other forces, cantilevered forces. Accordingly, it is desirable to have a deck sill component 46 and a rear post assembly 44 that is optimized to withstand the cantilevered forces applied to the rear deck post 50.

In various aspects, the deck mount 48 and deck post 50 components made according to the present technology are a die cast metal alloy or a high strength fiber reinforced composite material. Metal casting processes generally force molten metal under high pressure into a mold cavity. Slide die casting processes may be useful with the present technology, and use a number of perpendicular slides in the mold tool enabling very complex and accurate castings to be produced.

Aluminum and aluminum alloy castings have very good strength and hardness, and components can be die cast with relatively thin walls such they are lightweight and can contribute to weight savings and fuel efficiency. Further, they can be die cast with complex, intricate, and purposeful shapes and designs, with different thicknesses in different portions and regions in order to tailor the strength and other properties. Aluminum alloy castings are generally able to withstand the highest of operating temperatures of most die cast alloys while also providing outstanding corrosion resistance and heat dissipating properties. One exemplary aluminum alloy useful with the present technology is UNS A03650. Similarly, magnesium is an extremely versatile material and one of the lightest structural materials, about 33% lighter than aluminum. Magnesium alloys may provide increased stiffness and the strength-to-weight ratio of magnesium alloys is generally comparable with that of the strong alloys of aluminum. Alloy AZ91D is one of the most widely used magnesium die cast alloy and has an excellent combination of mechanical properties, corrosion resistance, and castability. Thus, in certain examples, the deck mount 48 and deck post 50 components can be made of a cast aluminum alloy, a cast magnesium alloy, a fiber reinforced composite, or a combination thereof.

Figure 5:
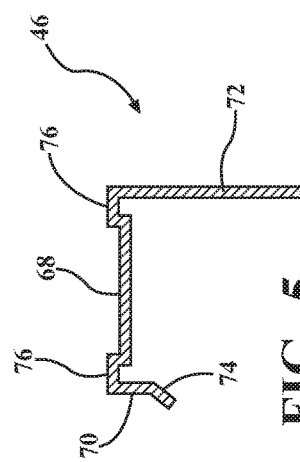
FIG. 5 is a cross-sectional view of the deck sill component of FIG. 4 taken along the line 5-5.
Figure 4:
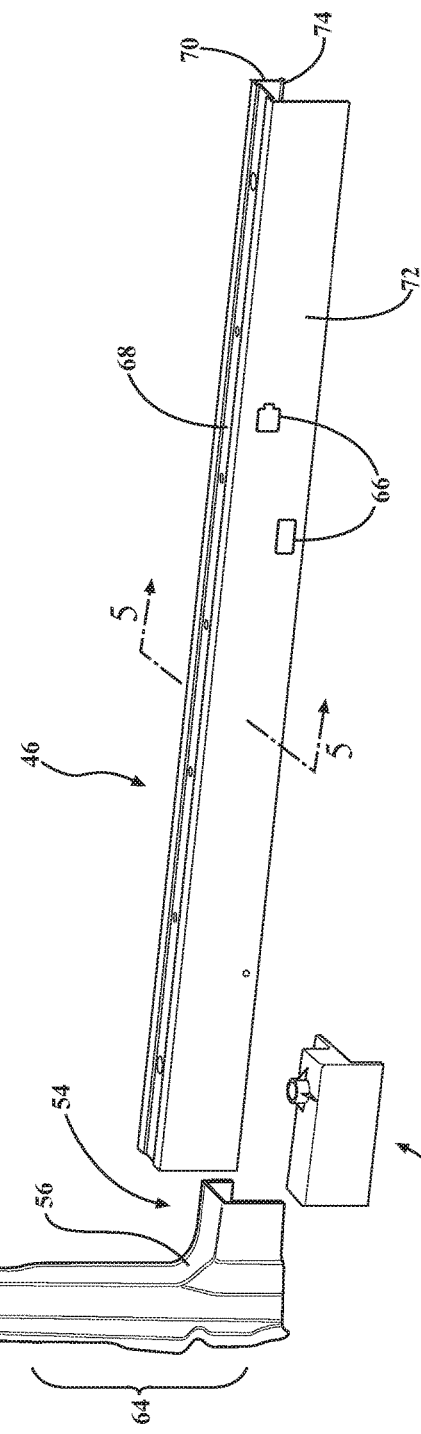
FIG. 4 is a partial exploded view of the combination of FIG. 2 illustrating the separate components.

The deck sill component 46 is preferably an aluminum or magnesium metal extrusion, such that it can be formed having a substantially uniform cross section along its length dimension as best shown in FIGS. 4 and 5. In other aspects, the deck sill component can be a stamped or otherwise formed or shaped metal or high strength composite material, i.e., not extruded, but similarly having a substantially constant cross-section for most of the length dimension. One of the advantages of having the uniform or substantially constant cross section is that it provides the ability for a constant transfer of load or applied force across the length dimension.

Other components of the vehicle 20, such as the tailgate 38 and the sidewall panels 32 and 34, may be made of five thousand series or six thousand series wrought aluminum alloy. For example, various wrought aluminum alloys are generally identified by a four digit number. The first digit generally identifies the major alloying element, and may be followed by three x's or three 0's (zeros). For example, the major alloying element of 5xxx or 5000 series aluminum alloy is magnesium, the major alloying element in 6xxx or 6000 series is magnesium and silicon, and the major alloying element of 7xxx or 7000 series is zinc. Additional numbers represented by the letter 'x' or number '0' in the series designation define the exact aluminum alloy. As should be understood, the various different metal alloys may provide any number of different tradeoffs pertaining to the strength, hardness, and workability of the metal alloy, as well as other properties that may be of consideration.

Figures 3A, 3B:
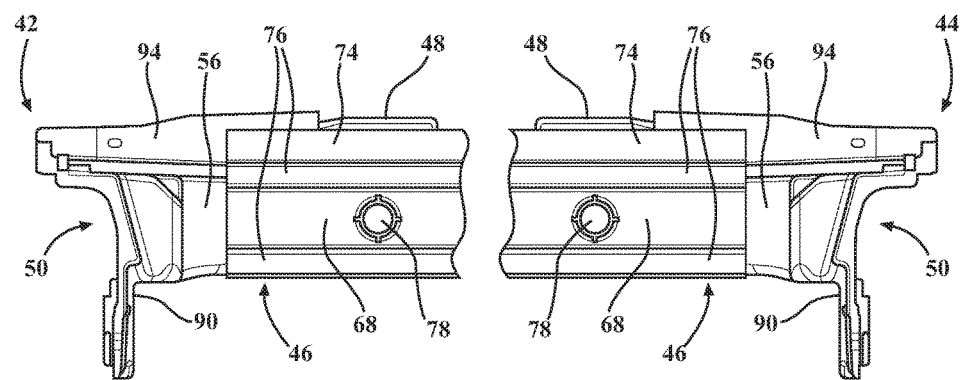
FIGS. 3A and 3B are partial top plan views of the two rear deck post assemblies as provided of FIG. 2.
Figure 6:
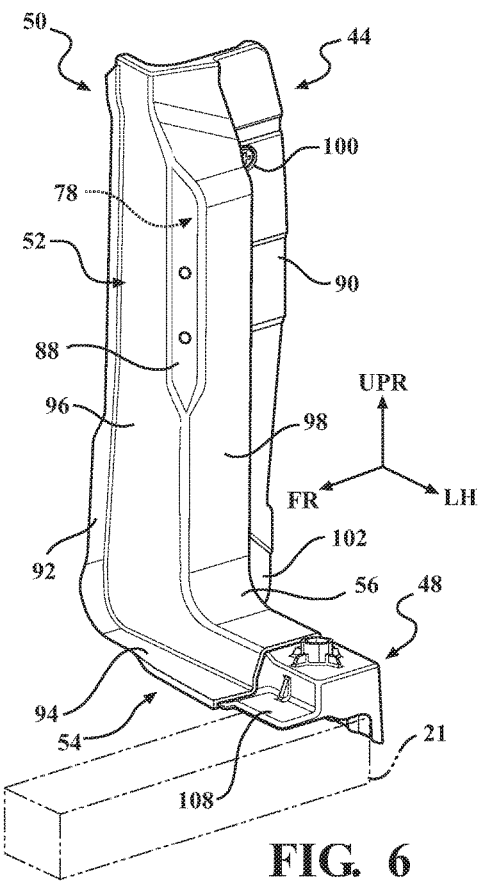
FIG. 6 is a side perspective view of an exemplary two-piece deck post according to various aspects of the present technology.

FIGS. 3A and 3B are partial top plan views of the two rear deck post assemblies 42, 44 as provided of FIG. 2 showing additional details. For a better understanding of the mechanical connections between the components, FIG. 4 is a partial exploded view of the combination of FIG. 2 illustrating the separate components including the deck sill component 46, one of the deck mounts 48, and a rear deck post 50. In the specific design shown, one standard assembly would be for the deck post 50 to be coupled to the deck mount 48 to form each two-piece assembly 42, 44 (as best shown in FIG. 6). For example, the horizontally extending coupling portion 54 of the deck post 50 may be placed over and/or coupled to the deck mount 48, optionally with mechanical fasteners, welding techniques, and the like. The left and right side two-piece assemblies 42, 44 are then arranged within the respective sides of the deck sill component 46 as shown in FIG. 2 to form the combination 40 that is shown in FIG. 2. For example, the deck sill component 46 may be placed over both the coupling portion 54 of the deck post 50 and the remaining exposed area from the deck mount 48. The combination 40 from FIG. 2 is then ultimately attached to the deck of the truck cargo bed 26 and is coupled to a frame component 21 (FIG. 6) using deck post bolts 78. The deck bolts 78 can be used to couple both the deck sill component 46 and the deck mount 48 directly to the frame 21, for example, such that the deck sill component 46 is coupled to the respective deck mount 48 and the vehicle frame 21 with one fastener. This not only reduces the number of parts, but also reduces the number of connections between the different parts, which ultimately reduces manufacturing and associated costs.

The pillar portion 52 of the rear deck post 50 may be provided with a plurality of different regions or sections having different strengths and other properties. For simplicity, FIG. 4 shows the pillar portion 52 as having an upper region 62 and a lower region 64. It should be understood that the pillar may be defined with many different regions to serve many different purposes. In one example, the upper region 62 may be provided with walls 80 and extending ribs 82, 84 (see, FIG. 7) of a first wall thickness, or upper wall thickness, while the lower region 64 may be provided with walls 80 and extending ribs 82, 84 of a second wall thickness, or lower wall thickness. Based on the strength requirements and need to address the cantilevered forces from applied stresses and loads, it may be desirable that the lower wall thickness be greater than the upper wall thickness. In certain aspects, it may be desirable that the wall thickness be provided with a thickness gradient, for example, where the wall thickness increases in a direction extending from the upper region 62 to the lower region 64 of the pillar portion 52 of the deck post 50. Similarly, the upper region 62 of the pillar portion 52 may be provided with an upper width dimension, and the lower region 64 of the pillar portion 52 may be provided with a lower width dimension, where the lower region 64 is wider than the upper region 62. The horizontally extending coupling portion 54 may be provided with a substantially U-shaped cross section, configured to mate with an upper surface of the deck mount 48, as well as to conform with a shape of the deck sill component 46.

FIG. 5 is a cross-sectional view of the deck sill component 46 of FIG. 4 taken along the line 5-5. In the various aspects, the deck sill component 46 has a substantially constant and uniform cross section along the longitudinally extending length dimension, and can evenly distribute and transfer an applied force in a longitudinal direction across a length of the deck sill component 46. The deck sill component 46 may be provided with various notches, apertures 66, and other shaped portions in order to accommodate for the use of utility vehicle frame and towing hitch attachments, for example, without the loss of the various advantages otherwise discussed herein. As shown in FIG. 5, the deck sill component 46 may include an upper wall portion 68 and opposing sidewall portions 70, 72. The sidewall portions 70, 72 can be of various dimensions. As shown, the outer sidewall portion 72 is provided with a greater extension than the inner sidewall portion 70, and the inner sidewall portion 70 is shown having an angled flange 74 extending therefrom. The flange 74 portion may be used for coupling to the deck mount 48 and the deck post 50, as well as to other components of the cargo bed 26. In various aspects, the deck sill component 46 is ultimately disposed underneath a bed floor 36 of the cargo bed 26. The upper wall portion 68 may be provided with upward facing ramp features 76 extending across the length dimension that may provide additional strength and/or connections to other components such as the bed floor 26. In other aspects, the reverse configuration may be provided, where there are downward facing ramp features (not shown).

Figure 7:
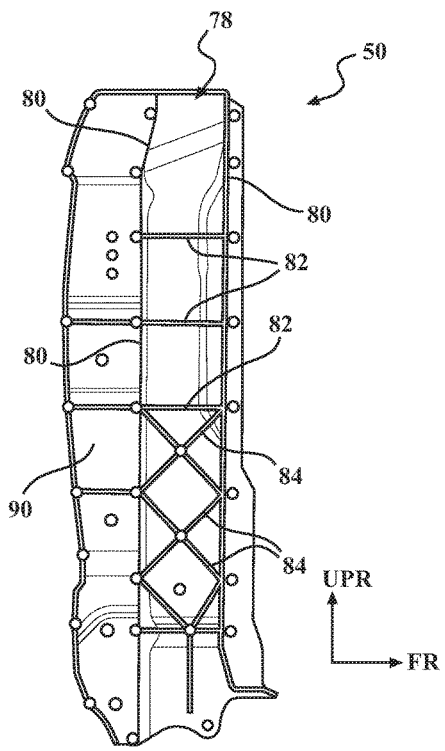
FIG. 7 is a side plan view of an exemplary rear deck post illustrating details of a cavity defined in the pillar and having a plurality of internal web, or rib, features.

FIG. 6 is a side perspective view of an exemplary two-piece deck post assembly 44 according to various aspects of the present technology. FIG. 7 is a side plan view of an exemplary rear deck post 50 illustrating details of an internal cavity 79 defined by the walls 80 in the pillar portion 52 and having a plurality of internal web, or rib, features. As noted above, the thickness of the walls 80 of the pillar portion 52 may vary at different regions or heights, such as at different locations along the vertical axis of the pillar portion 52. The strength of the deck posts 50 can be modified by incorporating various internal ribs, such as laterally extending ribs 82 and cross-shaped or "X" shaped ribs 84. The shape, sizes, thicknesses, and specific locations of the ribs 82, 84 within the cavity 79 can be mixed to accommodate an optimization of mass, performance, and packaging requirements. Notably, the interior of deck post 50 may need to accommodate various other features such as wiring and components for tail lights 86 and components for the tailgate 38.

The exterior of the deck post 50 similarly may be shaped, for example, with one or more notched or angled areas 88 to accommodate D-rings tie downs, or other components of the cargo bed 26 or the vehicle 20. As shown, the deck post 50 may be provided with side flange walls 90, 92, 94 that may serve as connection points for other components such as the sidewalls 32, 34 the cargo bed 36 (shown in FIG. 1), and the like. In one example, the side wall flange 94 may provide a surface for wire harness connections. The various surfaces of the flanges 94 may also be used to connect the deck post 50 and the deck mount 48. Preferably, at least a portion of the deck posts 50 define walls 96, 98 (or portions thereof) providing an exterior surface of the cargo bed 26 or the utility vehicle 20 itself, for example, that is exposed to an external environment. In other words, the deck post 50 not only serves as an important structural component, it also provides the exterior surface, and does not need to be covered by additional materials. The exterior of the deck post 50 may also define various apertures or connections points, for example, an aperture 100 for tailgate connections, an aperture 102 for a tailgate hinge, as well as apertures for connections such as lamp screws, a tailgate striker, and the like.

Figure 8:
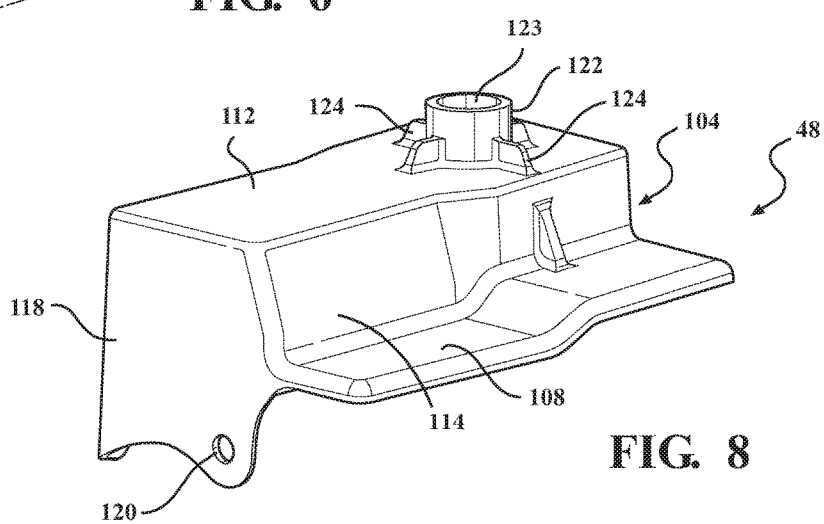
FIG. 8 is a first side perspective view of an exemplary deck mount.
Figure 9:
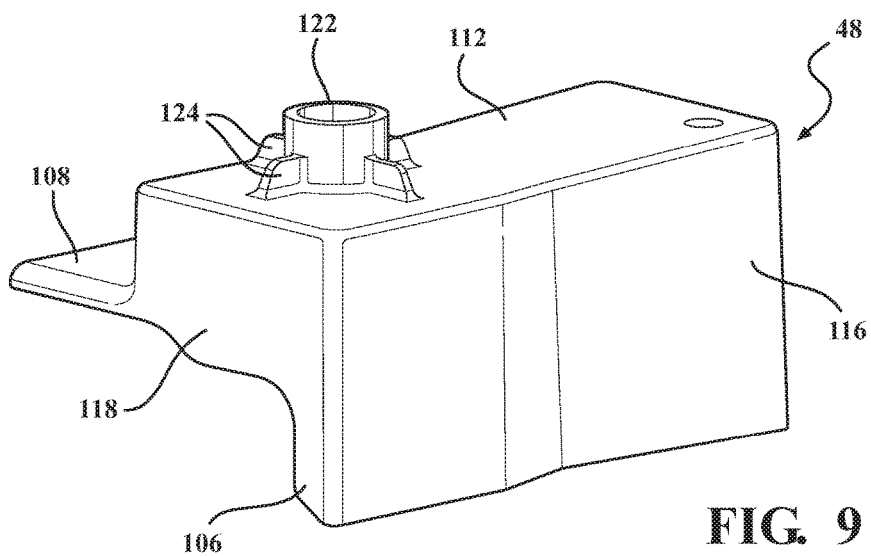
FIG. 9 is a second side perspective view of the exemplary deck mount, rotated about 180 degrees from the view as shown in FIG. 8.
Figure 10:
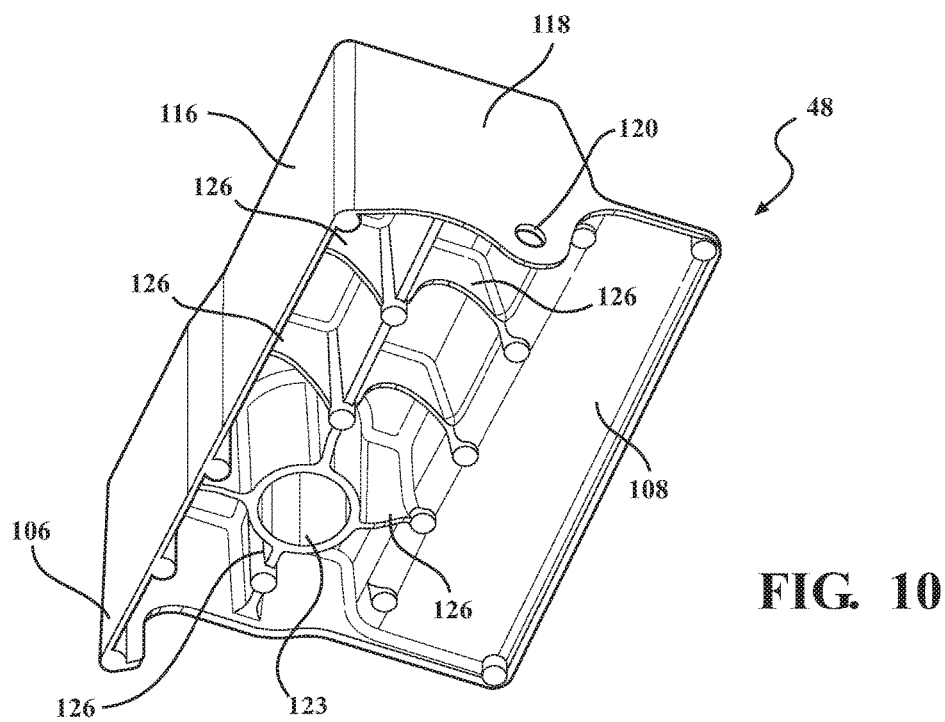
FIG. 10 is a bottom perspective view of the exemplary deck mount illustrating various internal web, or rib features.

FIG. 8 is a first side perspective view of an exemplary deck mount 48, and FIG. 9 is a second side perspective view of the exemplary deck mount 48, which is rotated about 180 degrees from the view as shown in FIG. 8. FIG. 10 is yet another perspective view of the deck mount 48, illustrating the bottom and interior of the deck mount 48 with its various internal web, or rib features according to one non-limiting aspect. In various examples, the deck mount 48 may be a cast metal alloy, as described above, and is generally provided with a main body portion, 104, a horizontally extending flange portion 108, and a vertically extending flange portion 106. The main body 104 may be defined by a top portion 112, a front side portion 114, a rear side portion 116, and opposing side portions 118. As shown, one side may also extend a short distance below the main body 104, depending on the particular design and how the deck mount 48 is configured to attach to other components, such as the vehicle frame 21 or brackets. Various apertures 120 may be defined in the deck mount for fastening purposes, for example, for coupling to a brace (not shown) to provide the deck side panel with stiffness. Certain apertures may be threaded to eliminate the need for nuts, or in certain aspects, clinch nuts may be used instead of weld nuts. At least one vertically extending collar 122 may be provided defining an aperture 123 for receiving the deck bolt 78. The deck bolt aperture 122 may extend a distance from the top 112 of the deck mount, and further be supported by a plurality of support webs 124. As shown in FIG. 10, the deck mount 48 may be cast with a plurality of support ribs 126 within an interior of the main body portion 104.

The combination of the uniformly shaped deck sill 46 and a tapered pillar portion 52 of the rear post 50 (or alternatively a rear post 50 having different regions 62, 64 with different thicknesses or strengths) is configured to provide a significant advantage in terms of weight and deflection. For example, the combined structure has an optimum weight, much lower than conventional deck sill and post combinations, and provides a distinct advantage of minimum deflection while withstanding the cantilevered forces generated due to an applied load. In various aspects, the pillar portion 52 of each deck post 50 is configured to exhibit a tapering I-value that is greatest at a lower region near the horizontally extending coupling portion in order to minimize any deflection from a force applied to the respective rear deck post assembly.

As used herein, the term I-value of a deck post (e.g., beam) represents the inertia of the deck post to resist bending. This may also be referred to as the second moment of are or second moment of inertia. For example, in the field of structural engineering, the second moment of area of a beam is a property used in the calculation of the beam's deflection and the calculation of stress caused by a moment applied to the beam. The planar second moment of area provides insight into a beam's resistance to bending due to an applied moment, force, or distributed load perpendicular to its neutral axis, as a function of its shape. The polar second moment of area provides insight into a beam's resistance to torsional deflection, due to an applied moment parallel to its cross-section, as a function of its shape. This resistance to deflection or torsion is function of shape, and not due to a beam's material stiffness, or elastic modulus.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A rear deck post assembly for reinforcing a cargo bed of a utility vehicle, the assembly comprising:
   a first deck mount coupled to a vehicle frame;
   a first rear deck post coupled to the first deck mount;
   a second deck mount coupled to the vehicle frame and spaced apart from the first deck mount;
   a second rear deck post coupled to the second deck mount;
   a deck sill component longitudinally extending between the first rear deck post and the second rear deck post, the deck sill component being formed using extrusion techniques and defining a U-shaped sleeve having a substantially uniform cross-section along a length dimension,
   wherein at least a portion of the first rear deck post and the second rear deck post define an exterior surface of the cargo bed of the utility vehicle that is exposed to an external environment.

2. The rear deck post assembly according to claim 1, wherein the first rear deck post and the second rear deck post comprise a cast aluminum alloy.

3. The rear deck post assembly according to claim 1, wherein the first rear deck post and the second rear deck post comprise a cast magnesium alloy.

4. The rear deck post assembly according to claim 1, wherein the first rear deck post and the second rear deck post comprise a fiber reinforced composite material.

5. A rear deck post assembly for reinforcing a cargo bed of a utility vehicle, the assembly comprising:
   a first deck mount coupled to a vehicle frame;
   a first rear deck post coupled to the first deck mount;
   a second deck mount coupled to the vehicle frame and spaced apart from the first deck mount;
   a second rear deck post coupled to the second deck mount;
   a deck sill component longitudinally extending between the first rear deck post and the second rear deck post,
   wherein respective walls of the first rear deck post and the second rear deck post define an interior cavity comprising a plurality of lateral ribs and X-shaped ribs extending between opposing walls.

6. A rear deck post assembly for reinforcing a cargo bed of a utility vehicle, the assembly comprising:
   a first deck mount coupled to a vehicle frame;
   a first rear deck post coupled to the first deck mount;
   a second deck mount coupled to the vehicle frame and spaced apart from the first deck mount;
   a second rear deck post coupled to the second deck mount;
   a deck sill component longitudinally extending between the first rear deck post and the second rear deck post,
   wherein the first rear deck post and the second rear deck post comprise a vertically extending pillar portion and a horizontally extending coupling portion, wherein respective walls of the pillar portion define a plurality of regions, each region having a different wall thickness.

7. The rear deck post assembly according to claim 6, wherein the plurality of regions includes an upper region defining an upper wall thickness and a lower region defining a lower wall thickness that is greater than the upper wall thickness.

8. The rear deck post assembly according to claim 7, wherein the wall thickness is provided with a thickness gradient that increases in a direction from the upper region to the lower region.

9. The rear deck post assembly according to claim 7, wherein the lower region is wider than the upper region.

10. The rear deck post assembly according to claim 6, wherein the first rear deck post and the second rear deck post are configured to exhibit a tapering I-value that is greatest at the lower region in order to minimize any deflection from a force applied to the respective rear deck post.

11. The rear deck post assembly according to claim 10, wherein the deck sill component is configured to exhibit a substantially constant I-value along a length dimension in order to evenly distribute the applied force in a longitudinal direction across a length of the deck sill component.

12. The rear deck post assembly according to claim 1, wherein the deck sill component is coupled to the first and second deck mounts and the vehicle frame.

13. The rear deck post assembly according to claim 1, wherein the deck sill component is disposed underneath a bed floor of the cargo bed.

14. The rear deck post assembly according to claim 1, wherein each deck mount comprises a cast aluminum main body portion, a horizontally extending flange portion, and a vertically extending flange portion.

15. A reinforced cargo area for a pickup truck, the reinforced cargo area comprising:
   a frame;
   a cargo bed coupled to the frame and having a forward end, a rearward end, two opposing sidewalls, and a bed floor;
   a first cast alloy deck mount coupled to the frame at the rearward end of the cargo bed;
   a first cast alloy rear deck post coupled to the first cast alloy deck mount;
   a second cast alloy deck mount coupled to the frame at the rearward end of the cargo bed and spaced apart from the first cast alloy deck mount;
   a second cast alloy rear deck post coupled to the second cast alloy deck mount; and
   a deck sill component disposed underneath the bed floor and longitudinally extending between the first cast alloy rear deck post and the second cast alloy rear deck post,
   wherein the first and second cast alloy rear deck posts comprise a vertically extending pillar portion and a horizontally extending coupling portion, further wherein respective walls of the pillar portion define a plurality of regions, each region having a different wall thickness.

16. The reinforced cargo area according to claim 15, wherein the first and second cast alloy deck mounts and cast alloy deck posts comprise at least one of an aluminum alloy and a magnesium alloy.

17. The reinforced cargo area according to claim 16, wherein the pillar portion is configured to exhibit a tapering I-value that is greatest at a lower region near the horizontally extending coupling portion in order to minimize any deflection from a force applied to deck post.

18. A pickup truck with a reinforced cargo area, comprising:
   a frame;
   a cargo bed coupled to the frame and having a forward end, a rearward end, two opposing sidewalls, and a bed floor;
   first and second spaced apart two-piece deck post assemblies, each two-piece deck post assembly comprising a cast aluminum deck mount coupled to the frame at the rearward end of the cargo bed, and a cast aluminum deck post coupled to the respective deck mount, each deck post comprising a vertically extending pillar portion and a horizontally extending coupling portion; and
   a deck sill component formed using extrusion techniques and defining a U-shaped sleeve having a substantially uniform cross-section along a length dimension, the deck sill component coupled to the deck mounts and longitudinally extending between the horizontally extending coupling portions of the deck posts,
   wherein the pillar portion of each deck post is configured to exhibit a tapering I-value that is greatest at a lower region near the horizontally extending coupling portion in order to minimize any deflection from a force applied to the respective rear deck post assembly.

* * * * *